(12) United States Patent
Manoria et al.

(10) Patent No.: US 11,967,253 B2
(45) Date of Patent: Apr. 23, 2024

(54) SEMI-AUTOMATED EVALUATION OF LONG ANSWER EXAMS

(71) Applicant: INTERNATIONAL BUSINESS MACHINES CORPORATION, Armonk, NY (US)

(72) Inventors: Vikas Kumar Manoria, Bengaluru (IN); Prasad Velagapudi, Visakhapatnam (IN); Sanjay Chawla, Bangalore (IN); Swamy Thippeswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 17/332,982

(22) Filed: May 27, 2021

(65) Prior Publication Data

US 2022/0383767 A1 Dec. 1, 2022

(51) Int. Cl.
*G09B 7/02* (2006.01)
*G06N 20/00* (2019.01)

(52) U.S. Cl.
CPC ............... *G09B 7/02* (2013.01); *G06N 20/00* (2019.01)

(58) Field of Classification Search
CPC ............ G09B 7/02; G09B 7/10; G06N 20/00
See application file for complete search history.

(56) References Cited

U.S. PATENT DOCUMENTS

| | | | |
|---|---|---|---|
| 8,301,640 B2 | 10/2012 | Al Badrashiny | |
| 8,666,742 B2 | 3/2014 | Detlef | |
| 9,099,007 B1 * | 8/2015 | Abumov | G09B 7/02 |
| 9,251,474 B2 | 2/2016 | Allen | |
| 9,679,256 B2 * | 6/2017 | Briscoe | G06N 20/00 |
| 9,704,099 B2 | 7/2017 | Koll | |
| 10,339,428 B2 * | 7/2019 | Hu | G06V 30/242 |

(Continued)

FOREIGN PATENT DOCUMENTS

| | | |
|---|---|---|
| CN | 101520802 A | 9/2009 |
| CN | 103049433 B | 10/2015 |
| WO | 2018006294 A1 | 1/2018 |

OTHER PUBLICATIONS

Alikaniotis et al., "Automatic Text Scoring Using Neural Networks," arXiv:1606.04289v2 [cs.CL] Jun. 16, 2016, Retrieved from the Internet: https://arxiv.org/pdf/1606.04289.pdf.

(Continued)

*Primary Examiner* — Omkar A Deodhar
(74) *Attorney, Agent, or Firm* — Caleb D. Wilkes

(57) ABSTRACT

A method, computer system, and a computer program product for semi-automated exam grading are provided. An exam that includes a question is received. A model answer to the question is received. The model answer includes an essay form. A computer system identifies constructs in the model answer. An examinee answer sheet that includes an examinee answer to the question is received. The computer system grades the examinee answer of the examinee answer sheet based on the constructs of the model answer. The computer system presents the graded examinee answer sheet to an evaluator for review. The graded examinee answer sheet includes one or more distinction markers along with the examinee answer. The one or more distinction markers indicate respective priority levels of corresponding portions of the examinee answer.

20 Claims, 6 Drawing Sheets

(56) References Cited

U.S. PATENT DOCUMENTS

| | | | |
|---|---|---|---|
| 10,489,511 | B2 | 11/2019 | De Ridder |
| 10,964,224 | B1* | 3/2021 | Zhang ............... G09B 19/00 |
| 11,410,569 | B1* | 8/2022 | Ferreira ............... G09B 7/02 |
| 2016/0196265 | A1 | 7/2016 | Allen |
| 2017/0154542 | A1* | 6/2017 | King ................. G09B 5/02 |
| 2018/0005541 | A1 | 1/2018 | Foley, Jr. |
| 2018/0197430 | A1* | 7/2018 | Apokatanidis ........ G06F 40/56 |
| 2021/0020059 | A1* | 1/2021 | Xue ................. G09B 7/02 |
| 2021/0343174 | A1* | 11/2021 | Colarusso ........... G06F 40/30 |

OTHER PUBLICATIONS

Alapati et al., "Assessing Student Understanding," Application and Drawings, Filed on Oct. 17, 2019, 53 Pages, U.S. Appl. No. 16/655,701.

Bouville, "Exam fairness," arXiv:0803.4235v1 [physics.gen-ph] Mar. 29, 2008, Retrieved from the Internet: https://arxiv.org/abs/0803.4235v1, 5 pages.

Chen et al., "Automated Essay Scoring by Maximizing Human-machine Agreement,"Proceedings of the 2013 Conference on Empirical Methods in Natural Language Processing, Oct. 18-21, 2013, Retrieved from the Internet: https://www.aclweb.org/anthology/D13-1180.pdf, pp. 1741-1752.

Ku Leuven, "Model answers and evaluation criteria," [accessed Mar. 9, 2021], Retrieved from the Internet: https://www.kuleuven.be/english/education/teaching-tips/feedback/model-answers-evaluation-criteria, 8 pages.

Manoria et al., "Technology for Exam Questions", Application and Drawings, Filed May 12, 2021, 43 Pages, U.S. Appl. No. 17/318,818.

Manoria et al., "Exam Evaluator Performance Evaluation", Application and Drawings, Filed on May 18, 2021, 50 Pages, U.S. Appl. No. 17/302,999.

* cited by examiner

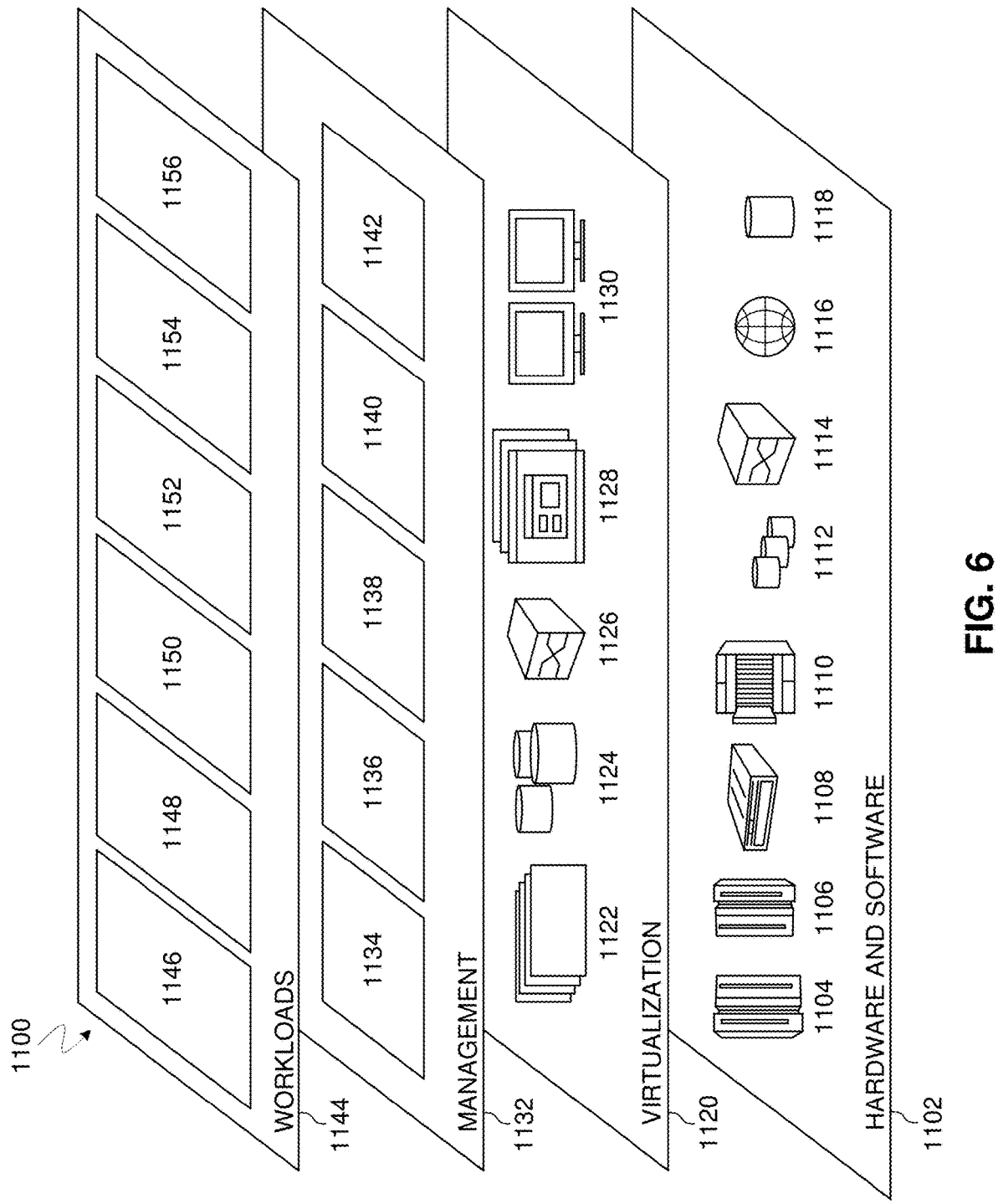

SEMI-AUTOMATED EVALUATION OF LONG ANSWER EXAMS

BACKGROUND

The present invention relates generally to the fields of exam-giving, and more particularly to providing semi-automated evaluation of exam responses for long answer examinations.

SUMMARY

According to one exemplary embodiment, a method for semi-automated exam grading is provided. An exam that includes a question is received. A model answer to the question is received. The model answer includes an essay form. A computer system identifies constructs in the model answer. An examinee answer sheet that includes an examinee answer to the question is received. The computer system grades the examinee answer of the examinee answer sheet based on the constructs of the model answer. The computer system presents the graded examinee answer sheet to an evaluator for review. The graded examinee answer sheet includes one or more distinction markers along with the examinee answer. The one or more distinction markers indicate respective priority levels of corresponding portions of the examinee answer. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 6 is a block diagram of functional layers of the illustrative cloud computing environment of FIG. 5, in accordance with an embodiment of the present disclosure.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and computer program product for semi-automated long answer exam examination which leverages best abilities of computers and human skills to ensure that students obtain accurate marks and feedback on their exams. Such long answer exams have been referred to as essay exams. The described embodiments help an exam evaluator receive necessary assistance to complete exam evaluation. Exam evaluation can be challenging and cause evaluators to experience fatigue from reviewing numerous written exams which can be tedious. The present embodiments help avoid a complete dependence on computing technology such as natural language processing (NLP), artificial intelligence (AI), and machine learning (ML). The present embodiments help supplement such computing technology with appropriate human oversight. The present embodiments may help improve transparency, consistency, and accuracy of long answer exam evaluation which will improve student or examinee satisfaction with the process. The present embodiments may also help improve teacher job satisfaction for teachers who are required to grade or evaluate numerous exams which have a long-answer format.

Figure 1:
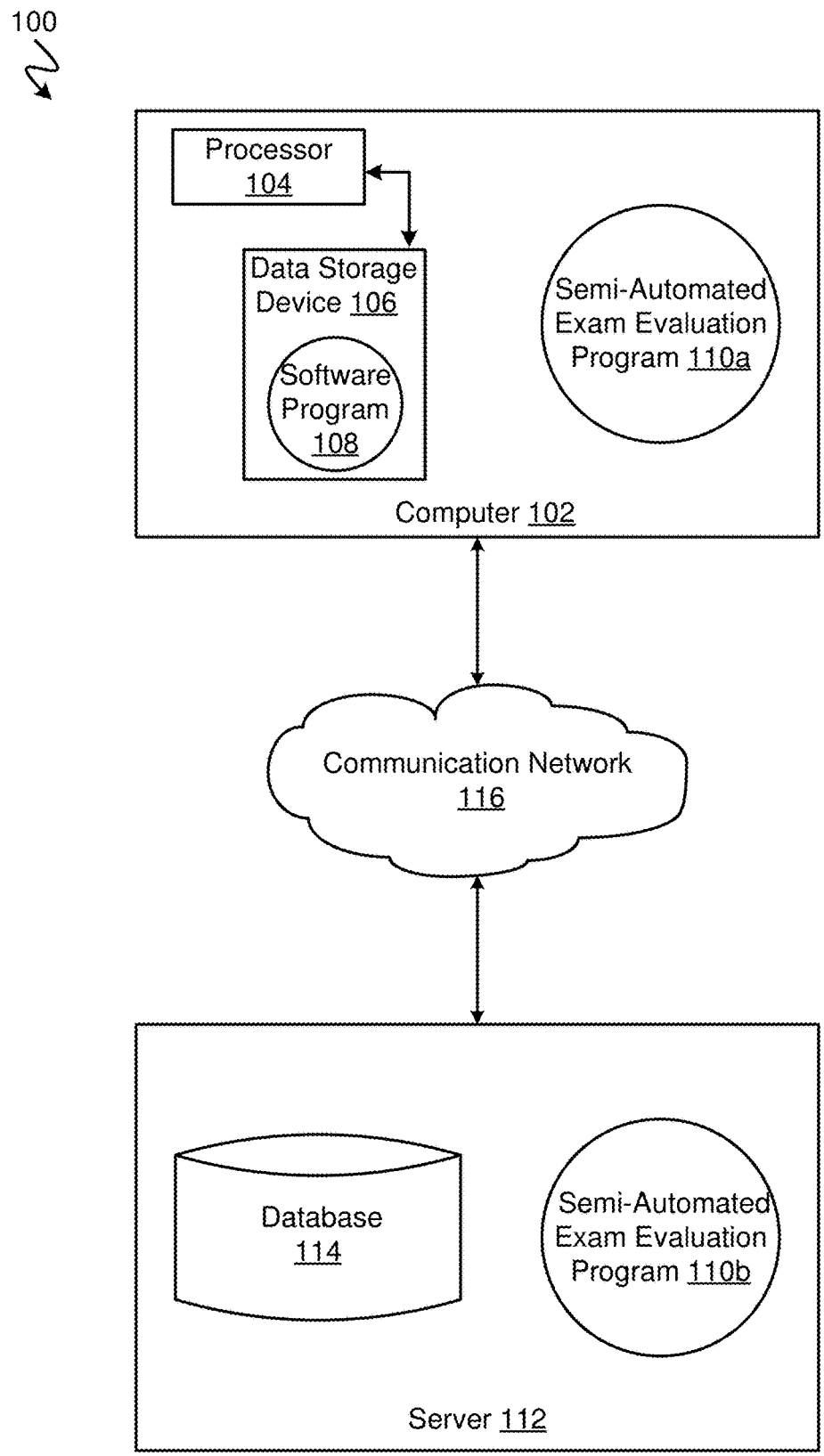
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a semi-automated long answer exam evaluation program 110a. The networked computer environment 100 may also include a server 112 that is a computer and that is enabled to run a semi-automated long answer exam evaluation program 110b that may interact with a database 114 and a communication network 116. The networked computer environment 100 may include a plurality of computers 102 and servers 112, although only one computer 102 and one server 112 are shown in FIG. 1. The communication network 116 allowing communication between the computer 102 and the server 112 may include various types of communication networks, such as the Internet, a wide area network (WAN), a local area network (LAN), a telecommunication network, a wireless network, a public switched telephone network (PTSN) and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server 112 via the communication network 116. The communication network 116 may include connections, such as wire, wireless communication links, or fiber optic cables. As will be discussed with reference to FIG. 4, server 112 may include internal components 902a and external components 904a, respectively, and client computer 102 may include internal components 902b and external components 904b, respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the client computer 102. The client computer 102 will typically be mobile and include a display screen and a camera. According to various implementations of the present embodiment, the semi-automated long answer exam evaluation program 110a, 110b may interact with a database 114 that may be embedded in various storage devices, such as, but not limited to a computer/mobile device 102, a networked server 112, or a cloud storage service.

Figure 2:
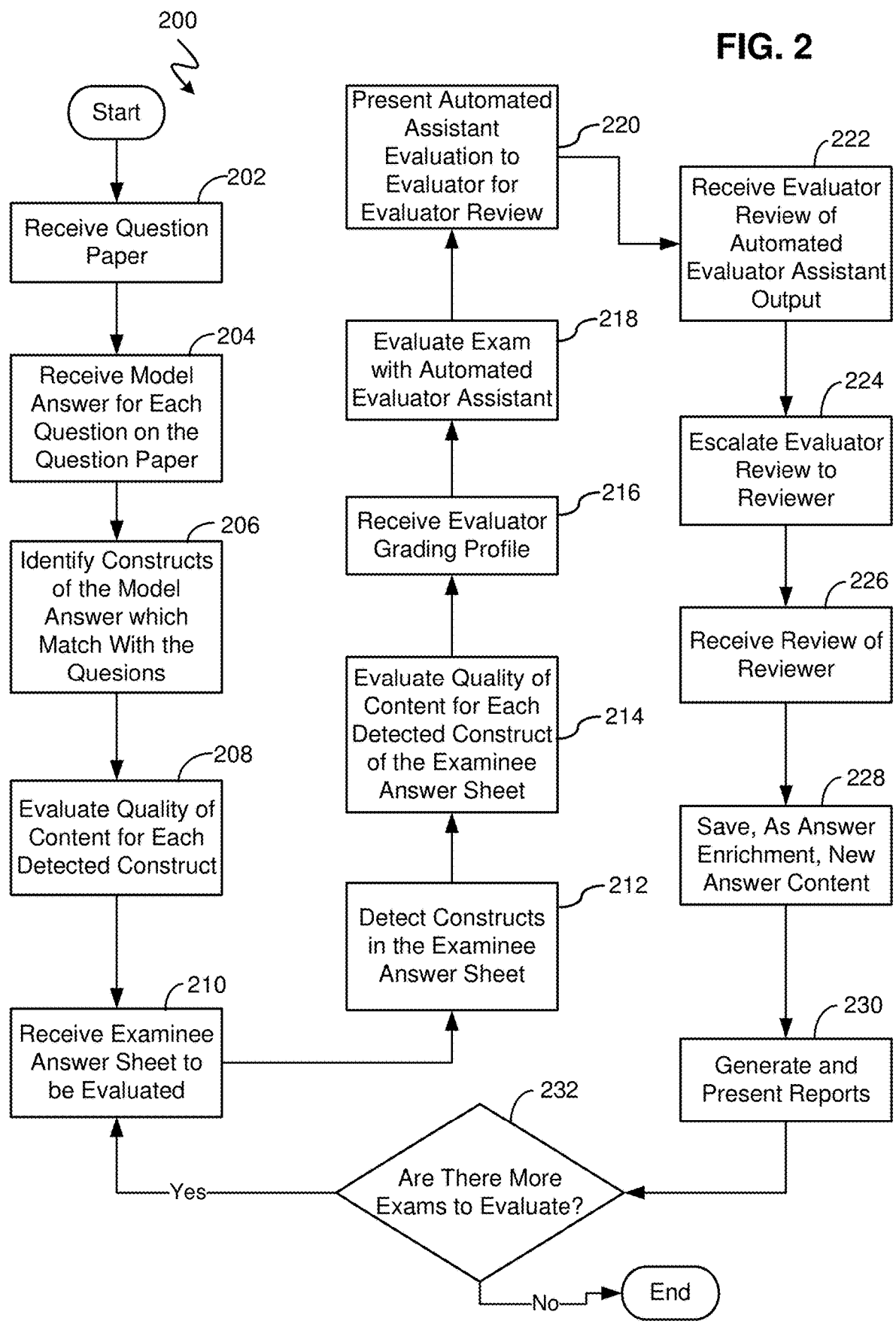
FIG. 2 is an operational flowchart illustrating a semi-automated long answer exam evaluation process according to at least one embodiment.
Figure 3:
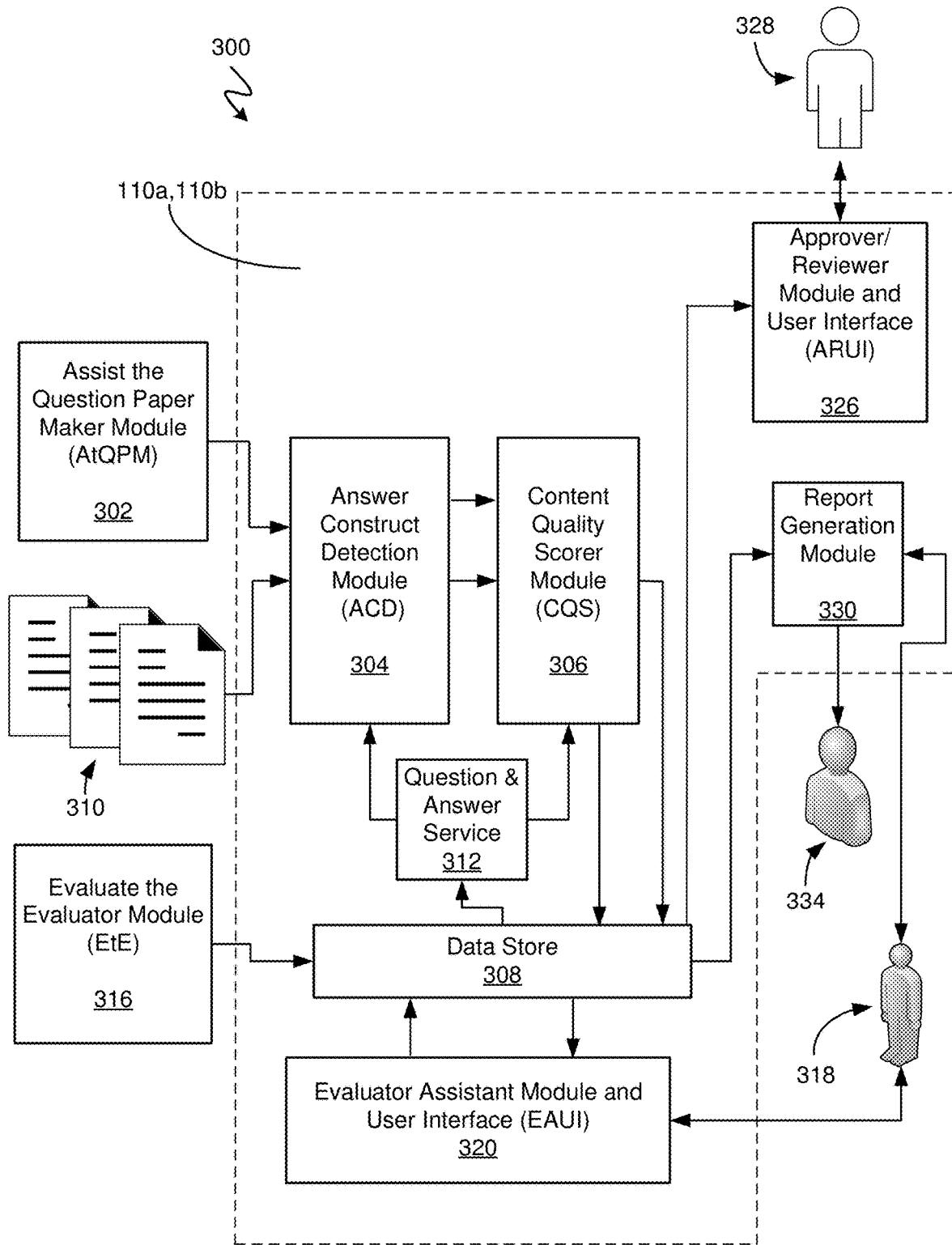
FIG. 3 shows a pipeline that may be used to perform the semi-automated long answer exam evaluation process according to at least one embodiment.

Referring now to FIG. 2, an operational flowchart depicts a semi-automated long answer exam evaluation process 200 that may, according to at least one embodiment, be performed by the semi-automated long answer exam evaluation program 110a, 110b. FIG. 3 which will be described along with FIG. 2 shows a pipeline 300 that is an example of a system that may be used to perform the semi-automated long answer exam evaluation process 200. The pipeline 300 shown in FIG. 3 shows that the semi-automated long answer exam evaluation program 110a, 110b may include various modules, user interfaces, and services and may use data storage to perform the semi-automated long answer exam evaluation process 200. A computer system with the semi-automated long answer exam evaluation program 110a, 110b operates as a special purpose computer system in which the semi-automated long answer exam evaluation program 110a, 110b assists an evaluator in performing reviews of long answer exams. In particular, the semi-automated long answer exam evaluation program 110a, 110b transforms a computer system into a special purpose computer system as compared to currently available general computer systems that do not have the semi-automated long answer exam evaluation program 110a, 110b.

In a step 202 of the semi-automated long answer exam evaluation process 200, a question paper is received. This question paper may include one or more questions intended to invoke a long answer response from an examinee. Examinees are those persons or individuals who would read the question paper in order to perform an exam and would subsequently provide answers to the questions. This exam may be given to the examinee as a part of an educational course. Such course and/or exam may be administered by a school or government office. The question paper may be considered an exam.

The question paper may be a physical paper with one or more questions printed thereon. For a question paper that is received as a physical paper, the semi-automated long answer exam evaluation program 110a, 110b may perform scanning and optical character recognition on the questions of the paper to convert the questions to be in a digital format. The scanning may be performed with a camera or image scanner associated with the computer 102. Such conversion into a digital format may facilitate computer language processing of the exam questions.

The question paper may also be a digital file, whereby the receiving of the question paper may occur via the communication network 116 that is shown in FIG. 1. The receiving may occur via the semi-automated long answer exam evaluation program 110a receiving an uploaded file at the computer 102 or via the semi-automated long answer exam evaluation program 110b at the server 112 receiving a file with a digital question paper that was transmitted via the communication network 116, e.g., that was transmitted from the computer 102 through the communication network 116 to the server 112.

The question paper may include questions that include a nested questions-based format. A nested questions-based format may include a main question and sub-questions which provide more direction regarding the main question. For example, the question paper may include a main question of "How can blockchain technology help a banking organization" and sub-questions related to the main question. The sub-questions may include, for example: What is blockchain technology? What are three problems in banking that can be solved through blockchain?, What are the solutions blockchain will implement to solve these three problems? What happened in two case studies in which these solutions have been implemented and tested? The sub-questions may help guide an exam taker to formulate a sufficiently detailed answer when responding to an exam main question.

In at least some embodiments, the question paper may be generated using an Assist the Question Paper Maker Module (AtQPM) 302 that is shown in the pipeline 300 in FIG. 3. The AtQPM 302 is configured to automatically prepare exam or test questions when course content is input therein. The AtQPM may include as sub-modules a Virtual Assistant Module (VAM) and an Exam Design & Simulation Module (EDSM). The AtQPM may access course content in various forms, including text, audio, video, etc., that may be stored in a database, e.g., in the data store 308 shown in FIG. 3 in the data storage device 106 shown in FIG. 1, and/or in the database 114 shown in FIG. 1. Such course content may include course objectives, a course summary, and detailed outlines, which may be organized in hierarchical segments such as, for example, Course→Modules→Chapters→Topics→Subtopics. The course content may reflect materials that have been taught or presented to students during a class. An expectation of such course typically is for students to be examined regarding the materials they were taught during the class.

The VAM, and thereby the AtQPM 302, may include advanced text analysis programs which may analyze large bodies of text or text content and then be able to answer, in an automated manner, questions about the text content. This program of the VAM may include a question & answer (Q&A) artificial intelligence (AI) application in which machine learning algorithms are implemented. The Q&A AI may include a machine learning model that may be trained by inputting course content into the Q&A AI.

The EDSM of the AtQPM 302 may in an automated or semi-automated manner generate questions for an exam based on the course content. The questions may be provided in an order that matches the order in which the course content was presented to the students or may be provided in a random order that does not match the order in which the course content was presented to students.

Inputs may be given to the EDSM in order to guide the question creation. The inputs may include factors such as an answer writing speed in words per minute of students or examinees who will be taking the exam, a maximum possible score for answering questions correctly and completely, what scope of the course content should be covered by the questions, e.g., all chapters or specific chapters or portions of the course content, and examinee sophistication rating. The maximum possible score may be referred to as marks. The examinee sophistication rating may relate to expected language and writing skills of the expected exam takers and a need to provide increased or decreased simplicity and clarity for questions to the exam takers. In generating the exam questions, the EDSM may provide corresponding information about the course content scope intended to be covered via the question. When a user inputs a maximum possible score for a question, the EDSM may break down the maximum score into maximum portions for sub-questions related to the main question. For example, a main question having a maximum score of 10 and having four sub-questions may have maximum score possibilities of 3, 2, 3, and 2 for the four sub-questions (3+2+3+2=10).

In one example, a user may indicate that a selected answer scope from a course content is the following portion of an outline:
    a) Blockchain for Architects
        i. Bitcoin cryptocurrency: Most Popular Application of Blockchain
        ii. Blockchain vs. Shared Database
        iii. Myths about Blockchain
        iv. Limitations of Blockchain technology v. Future Roadmap These five headings for this defined scope provide a data set used by the EDSM to generate a set of potential questions among which the user may select. In this example, for the first question of the set the EDSM may randomly select a heading from the five headings of the defined scope and may generate a first question in response to the selected heading. If the EDSM determines the selected heading is insufficient, then the EDSM may instead randomly select an additional heading from the dataset. If the EDSM determines the selected headings are still insufficient, the EDSM may repeat random heading selections until the selected headings are sufficient to generate the question. However, if the EDSM determines all the headings of the defined scope are insufficient, then the EDSM may select, in random order, three paragraphs of the course content under the selected subtopics, may find key phrases and entities from each paragraph, and may generate an exam question. In one example instance, the EDSM generates the following question "Blockchain is said to be able to do for the BFSI industry what the internet does to the computing world today. Do you agree with that (please provide supporting facts)?"

The examinee sophistication input factor may help the EDSM and the AtQPM 302 generate an exam question with an appropriate level of simplicity and clarity so that the question is aligned with expectations for the student population. The question simplicity and clarity may be lower for a lower rating and may be higher for a higher rating. The user can set this parameter for the entire test or for each individual question.

The EDSM may calculate a complexity score for each potential question. If the calculated complexity score exceeds a threshold value for examinee sophistication rating that the user specified in the initial input process, then the EDSM may automatically rephrase the question to simplify the question while seeking to avoid or minimize any change in meaning of the question. The EDSM then may recalculates a complexity score for the new version of the question and, if necessary, repeat the comparison and rephrasing until the complexity score does not exceed the specified examinee sophistication rating. For example, the EDSM may simplify an exam question to read "For the BFSI industry, Blockchain is said to be able to do what the internet is doing to the technological world today. Do you agree (please provide supporting realities)?"

Once the EDSM has generated one question from the one or more headings (or headings and paragraphs) randomly selected as described above, the EDSM may generate additional questions by repeating this random selection process.

Figure 4:
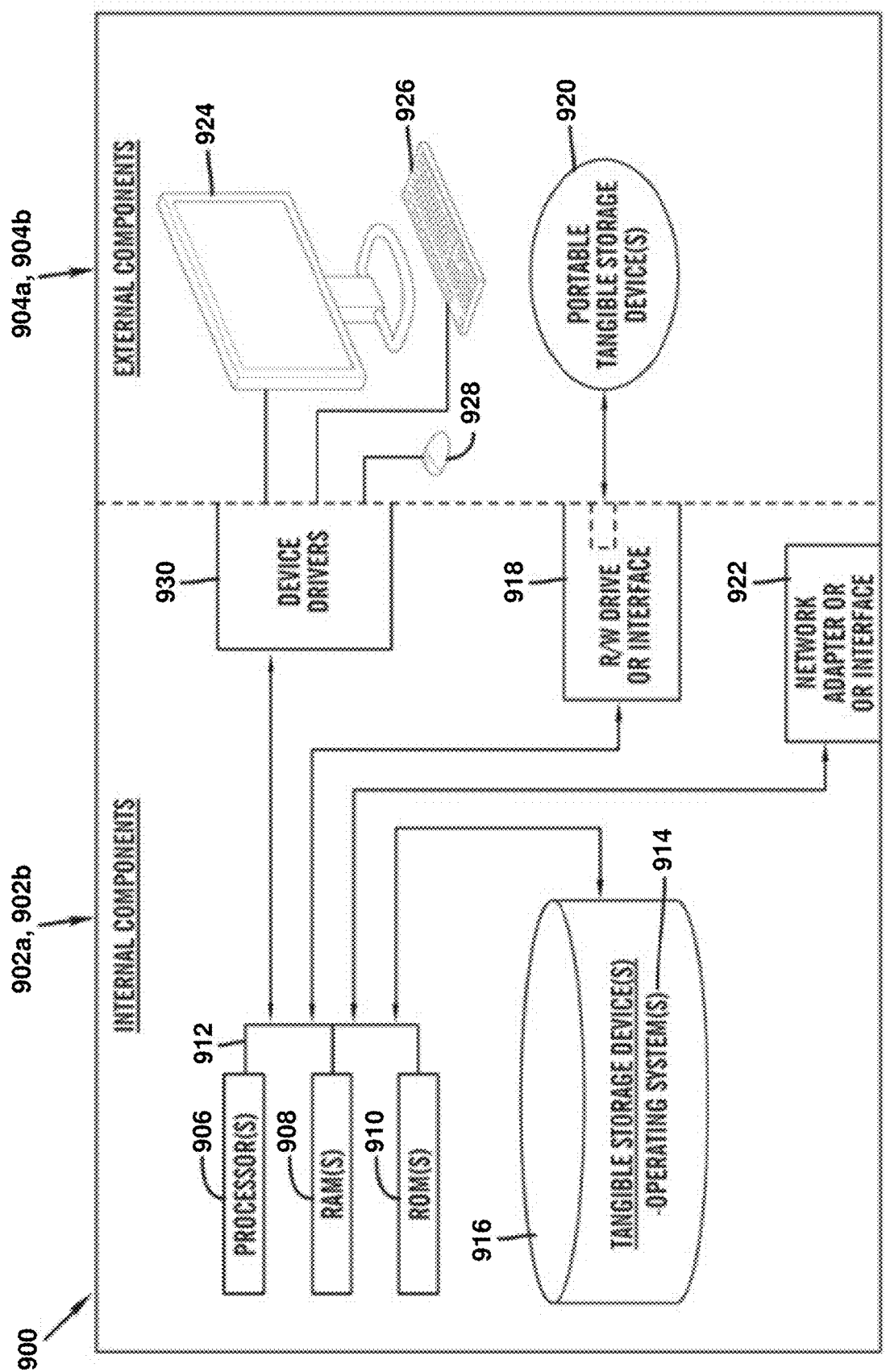
FIG. 4 is a block diagram of internal and external components of computers, phones, and servers depicted in FIG. 1 according to at least one embodiment.

The AtQPM 302 may present to a program user, e.g., to an evaluator 318, the exam questions that are generated to obtain approval of or modification of the generated questions. The AtQPM 302 may generate a graphical user interface (GUI) that displays the exam questions and which is configured to receive feedback from the evaluator 318 regarding the exam questions. A user may review the generated questions and decide a broader or narrower scope should be covered by the questions. The GUI may help the evaluator 318 identify that more complete coverage of the course content should be included in the exam questions that are generated. The generated questions may be presented to the program user for review by the user. The generated questions may be displayed on a display screen of the computer 102, e.g., on the display monitor 924 that is shown in FIG. 4, for review by the program user who seeks to generate a set of quality questions to be used in an exam. A user may use a data input device such as the keyboard 926 shown in FIG. 4 or a touch screen on a computer to type in an alternative question or an alternative course content scope intended to be covered by the exam question. A user could also use these input methods to provide a confirmation of acceptance of the questions that are generated by the AtQPM 302.

In a step 204 of the semi-automated long answer exam evaluation process 200, a model answer for each question on the question paper is received. The model answer may include an essay or long answer form.

The one or more model answers may be provided on one or more physical papers. For model answers that are received on a physical paper, the semi-automated long answer exam evaluation program 110a, 110b may perform scanning and optical character recognition on the model answer to convert the answers to be in a digital format. The scanning may be performed with a camera or image scanner associated with the computer 102. Such conversion into a digital format may facilitate computer language processing of the model answers.

The model answers may be received as a digital file, whereby the receiving may occur via the communication network 116 that is shown in FIG. 1. The receiving may occur via the semi-automated long answer exam evaluation program 110a receiving an uploaded file at the computer 102 or via the semi-automated long answer exam evaluation program 110b at the server 112 receiving a file with digital model answers that was transmitted via the communication network 116, e.g., that was transmitted from the computer 102 through the communication network 116 to the server 112.

The model answers may also be generated in an automated or semi-automated manner via the AtQPM 302 shown in the pipeline 300 that is depicted in FIG. 3. The EDSM may send a question to the VAM, and the VAM may generate an answer based on course content and based on input factors that may be input by a user into the AtQPM 302. The VAM may use advanced text analysis and NLP to scan the course content and match certain portions of the course content with the exam question. The VAM may also reformulate the identified relevant course content into an improved form for presentation as an exam question model answer. The input factors may include one or more of an answer writing speed in words per minute of students or examinees who will be taking the exam, a maximum possible score for answering questions correctly and completely, what scope of the course content should be covered by the questions, and examinee sophistication rating.

Regarding a possible input factor of examinee answer writing speed, if the test is targeted to less-advanced students then 15-20 words/minute may be appropriate. If the test is for post graduate students then 50-60 words/minute may be more appropriate. This parameter may help determine a tentative total time that is appropriate for a target examinee group to answer a question. The user may indicate to the EDSM and VAM that a single value of this parameter applies to all answers or may indicate respective values for respective answers based on the varying answer complexities. For example, the user may deem an answer to be more complex if the answer requires the student to draw a diagram or solve a mathematical equation.

Regarding the possible input factors of question/answer content scope and maximum possible score, a user may input one section of the course content and may input a maximum possible score. For example, the user may input a chapter 2 and may input a maximum possible score of 10 for answering the question correctly and completely.

The EDSM may generate a set of questions. A user may select one of the questions that asks, "How can blockchain technology help a banking organization?" In response to the user selection, the VAM may generate an answer. The VAM may incorporate input factors of an indicated writing speed, possible score, and content scope to help guide the model answer generation.

If the user sees the VAM-generated model answer and decides the VAM-generated answer is adequate, then he/she can indicate via the GUI that the model answer is accepted. This acceptance may also indicate that the last inputs for the question and answer are to be continued.

If the user decides the VAM-generated answer is not adequate, then the user can revise the inputs, the question, or both, and can command the VAM to responsively generate a new model answer.

The VAM may use text analytics features to extract information including entities, relationships, keywords, and semantic rules from the course content. Based on the information the VAM extracts from the content and based on one or more inputs provided by the user, the VAM analyses the provided course content, matches parts of the course content with a desired scope for a question, and generates an answer for the selected question.

The AtQPM 302 may present to a program user, e.g., to an evaluator 318, the exam question model answers that are generated. This presentation may be to obtain approval of or modification of the model answers. For example, the user may wish to further limit or expand the scope of the question based on the answer generated by the VAM. The user may revise the user input and may request that the EDSM generate a revised question. The user, e.g., the evaluator 318, may also request that the VAM generates a revised answer in response to the revised input.

In one example, the EDSM may calculate an expected number of words (ENW) for the requested model answer. This calculation may be based on (a number of words/minute of the user specified answer writing speed)×(a number of minutes the exam evaluator specifies for the test)× ((the specified marks for this question)/(total number of marks for the exam). Based on the user selected answer scope for the question, the VAM generates an answer and passes the generated model answer back to the EDSM. The EDSM then counts the actual number of words in the generated answer and compares the actual number with the ENW. If the result is close to ENW by +−10%, the question may be approved or processed further. If the result is not close, the EDSM may present an indication to the user about the undesirable length and may present to the user possible actions that the user can take.

The possible actions may include i) adjust the allocated marks based on the actual answer length; ii) adjust the question, which may include providing an answer template as described herein below, and then repeat the process of VAM automatic answer generation, EDSM answer evaluation and user adjustment until the answer length is acceptable; iii) accept VAM generation of at least one optimal length question from the same scope; iv) join questions for which the answers have a combined length that more closely matches the ENW; and v) accept the question despite the undesirable length of the answer.

In one embodiment, the evaluator 318 may provide a template of a main question and sub-questions in a nested-question format as follows in Table 1 (with the main question being "How can blockchain technology help a banking organization?").

TABLE 1

| Question Details for Internal Use | Hint to student & evaluator | Est. # of Words | Marks |
| --- | --- | --- | --- |
| What is blockchain technology? | Define blockchain. | 80 | 2 |
| Provide top 3 problems in Banking to be solved through blockchain. | 3 relevant banking problems | 150 | 3 |
| Suggest solutions of top 3 banking problems through blockchain. | Respective solution through blockchain | 150 | 3 |
| Discuss two case-studies where solution has been implemented | Two case-studies | 100 | 2 |

This nested format may be provided with the indication that the total test would have an estimated number of 480 words for the expected answers and would be worth a total of ten points on the exam. The evaluator 318 may provide the estimated number of words and marks as input factors which the VAM may use to generate a model answer. The hints information column may be presented to examinees during the examination. The EDSM may determine whether the model answer that is generated has an acceptable length by making a calculation as described above.

The AtQPM 302 may generate a GUI that displays the model answers along with the exam questions and which is configured to receive feedback from the evaluator 318 regarding the model answers. A user may review the generated model answers and decide a broader or narrower answer should be provided. This manual review allows the user to eliminate or reduce overlapping content in the model answers and/or to identify that more complete coverage of the course content should be included in the model answers. The generated model answers may be presented to the program user for review by the user. The generated model answers may be displayed on a display screen of the computer 102, e.g., on the display monitor 924 that is shown in FIG. 4, for review by the program user who seeks to generate a set of model answers to be used for exam grading. A user may use a data input device such as the keyboard 926 shown in FIG. 4 or a touch screen on a computer to type in an alternative or supplemental model answer or course content scope intended to be covered by the model answer. A user could also use these input methods to provide a confirmation of acceptance of the model answers that are generated by the AtQPM 302.

In one embodiment, once the user is initially satisfied with questions the system has generated for a test, the user may then command the EDSM to determine amounts for coverage and duplication, respectively, in VAM-generated answers to those questions. The EDSM may then generate coverage and duplicity scores for the generated answers. The coverage and duplicity scores may be used by the AtQPM 302 to determine an overall test quality, for which the EDSM generates a test quality score. The test quality score may be based on a weighted combination of the duplicity and coverage scores, the combined total of the understandability ratings of the questions, the overall number of words of the simulated answers generated by the VAM/time allocated for the test, and a measure of effectiveness of hints for the questions in the exam. The formula for the test quality score may give great weight to low duplicity and high coverage, medium weight to an understandability rating and to number of words per minute, and low weight to hint effectiveness.

In a step 206 of the semi-automated long answer exam evaluation process 200, constructs of the model answer which match with the questions are identified. This step 206 may be performed by an answer construct detector module (ACD) 304 that is shown in FIG. 3. The ACD 304 may analyze the question paper received in step 202 and the model answer received in step 204 to detect necessary constructs within the model answer and to detect one or more sequences of these necessary constructs. This detection may help generate a baseline structure that may be stored in a data store 308. The baseline structure may be used subsequently to evaluate various answers that examinees produce in order to answer a given question on an exam. Other inputs from the AtQPM 302 may also be saved in the data store 308.

Each construct from the model answers may be a sentence portion, a clause, a sentence, a paragraph, a set of consecutive sentence portions, a set of consecutive clauses, a set of consecutive sentences, and/or a set of consecutive paragraphs. The construct may match with content that is stored as being linked to a question or a nested question. Both the content and the question or nested question linked thereto may be stored in the data store 308 that is accessible via a Question and Answer Service (Q&A Service) 315. A baseline construct may be alike to a nested question answer. A baseline construct might also in some cases be dissimilar to a nested question answer. A maximum number of baseline constructs for a Q&A pair would be equal to or less than a number of nested-question answers for the questions of a question paper. Natural language processing (NLP) for determining semantic sentence similarity may be used to perform the construct matching. Artificial intelligence for text analysis may also be used to perform the construct matching. One or more machine learning models may be deployed by the ACD 304 and the Q&A Service 315 to perform the construct identification and matching. The identified constructs may be passed from the ACD 304 to a Content Quality Scorer Module (CQS) 306.

In a step 208 of the semi-automated long answer exam evaluation process 200, quality of the content for each detected construct is evaluated. The detected constructs are those that were detected in the step 206. This step 208 may be performed by the Content Quality Scorer Module (CQS) 306 that is shown in FIG. 3. The quality of the content may be analyzed and determined with respect to various parameters such as answer completeness (C), answer accuracy (A), and personal nuances (P). These three particular parameter examples may be referred to as CAP factors or as answer generating factors (AGFs). Quality scores may be generated for each detected construct and with respect to the various parameters. The CQS 306 may implement natural language processing (NLP) for determining semantic sentence similarity, artificial intelligence for text analysis, syntax analysis, and one or more machine learning models to perform the quality score determination. The CQS 306 may implement n-gram list generation for text comparison and word sense disambiguation for word meaning determination and which may implement a tri-gram language model.

The answer completeness (C) parameter may indicate whether and to what extent the answer, e.g., the construct, that is given to a question has all the necessary and relevant content. For example, the evaluation of answer completeness may determine whether the answer and/or construct provides term definitions, types, short/long descriptions, examples, advantages, and/or disadvantages. An answer might be missing constructs, might have additional constructs that were not included in the model answer, and might have a haphazard sequence of constructs which impacts the length and coverage of an answer and could increase or decrease an answer completeness (C) score for an exam answer. Natural language processing (NLP) for determining semantic sentence similarity may be used to perform the answer completeness determination. Constructs from the exam answers may be compared with stored course content to determine semantic similarity. Artificial intelligence for text analysis may also be used to perform the completeness determination. One or more machine learning models may be deployed by the CQS 306 to perform the completeness determination.

The answer accuracy (A) parameter may indicate whether the content provided under the answer constructs is correct in the context of the asked question from the exam. This answer accuracy parameter may primarily relate to technical correctness of the content. This answer accuracy may additionally relate to the correctness of language aspects in the answer and/or constructs such as grammar, sentence formation, spelling, vocabulary, etc. Natural language processing (NLP) for determining semantic sentence similarity may be used to perform the answer accuracy determination. Constructs from the exam answers may be compared with course content to determine semantic similarity. Word processing grammar and spelling checking programs may additionally be implemented to perform language review as a part of this answer accuracy (A) determination. Artificial intelligence for text analysis may also be used to perform the accuracy determination. Search engine-indexed third party content portions with AI-determined semantic similarity to answer constructs of the model answer may also be generated and accessed to compare for accuracy determination. One or more machine learning models may be deployed by the CQS 306 to perform the accuracy determination.

The personality nuances (P) parameter may indicate unique personality aspects of an examinee, of an evaluator, or of a person who prepared course content material. These personality aspects may include psycho-emotional aspects, cultural aspects, geographical aspects, professional aspects, and other aspects which may indicate a type of diversity. Such aspects may be indicated in the answer content that is received and analyzed, in the answer evaluation, and/or in the course content that is used to generate the exam and model answers. Such personality nuances may potentially impact essay exam evaluation dynamics depending on the personality traits, experiences, and psycho-emotional maturity of the exam evaluator. Determining the personality nuances may help prevent the semi-automated long answer exam evaluation program 110a, 110b from automatically punishing an examinee who provides some technically correct answers blended with some colloquial language. Natural language processing (NLP) may be used to perform the personality nuances determination. Artificial intelligence for text analysis may also be used to perform the accuracy determination. One or more machine learning models may be deployed by the CQS 306 to perform the personality nuances determination.

Table 2 below lists possible sub-categories for these CAP (Completeness-Accuracy-Personality Nuances) factors that were introduced above:

TABLE 2

| Completeness | Accuracy | Personality Nuances* |
|---|---|---|
| C1. Conformance to content Structure | A1. Content correctness under each structure | P1. Emotionally charged tone/sentence constructs/ vocabulary* |
| C2. Identify missing and extra structures | A2. Sentence structure - well formedness, length, understandability* | P2. Constructs & Vocabulary used due to cultural/ professional diversity* |
| C3. Flow/Sequence of content structures* | A3. Spelling and grammar* | P3. Language nuances due to rural/urban and other geo-specific influences* |
| C4. Length of answer* | A4. Identical and repeated mistakes* | |

Note—Exemption categories are indicated by the (*) sign, where evaluation parameters can be configured according to test design and test administrator preferences. For example, "Accuracy—Identical and repeated mistakes" can be a one-time marks deduction or a frequent marks deduction in a single answer or in an entire answer-sheet.

TABLE 3

| Factors ↓ & Their Levels→ | High | Medium | Low |
|---|---|---|---|
| Completeness (C) | Conformance & <10% missing | 10%-50% missing | >50% missing |
| Accuracy (A) | 71%-95% | 41%-70% | 10%-40% |
| Personality Nuances (P) | 2 or 3 nuances | 1 high 1 low | No or low nuance of one type |

TABLE 4

Model Answer

| Nested QA No. | Construct No. | Quality Type | Baseline Score |
|---|---|---|---|
| 1 | 1 | 1 (HHL) | 9.5 |
| 1 | 2 | 2 (HML) | 8.5 |
| 1 | 3 | 3 (HLL) | 7.0 |
| 2 | 4 | 1 (HHL) | 9.0 |
| 2 | 5 | 2 (HML) | 8.0 |
| 2 | 6 | 3 (HLL) | 6.5 |
| 3 | 7 | 1 (HHL) | 9.0 |
| 3 | 8 | 2 (HML) | 8.5 |
| 4 | 9 | 3 (HLL) | 7.0 |
| 4 | 10 | 3 (HLL) | 6.0 |

CAP factors can be configured as per requirements for an exam evaluation project. One example of CAP factors and levels for the CAP factors is shown above in Table 3. Table 3 shows that each of the CAP factors may be divided into three levels—high, medium, and low—based on an intensity of the value. An exam answer which receives an overall rating based on the three CAP factors may have one of a total of twenty seven combinations, ranging from high-high-high (HHH) to low-low-low (LLL) and many combinations in-between, e.g., HHL, HML, HLL, MLH, MLL, LLH, etc. These combinations an overall rating may be referred to as an answer type (an A-type). In some embodiments, these combinations may be reduced further for calculation by grouping several of the CAP determinations together, e.g., having both a 2 and 4 combination of the CAP factors as being rated "very good". These narrowed groupings may be referred to as target score categories "TSC's". An exam administrator may input CAP and TSC configurations for a particular exam review. These detected CAP factor values for model answer constructs may become a baseline item as is shown in Table 4. This baseline structure helps in evaluating any answer for a question in a question paper. The baseline structure may be stored for later use, e.g., may be stored in the data store 308 so as to be accessible at a later time.

In another embodiment, the CQS 306 may determine an essay content quality score based on a combination of a style score, a punctuation score, a spelling score based on spelling accuracy, a quotation score, an enrichment score based on new and accurate vocabulary terms used in an answer, a syntax analysis score, a convergence score based on the answer sticking to a topic, an idea score measuring connectivity of answer topic and question topic, and a cohesion score measuring smoothness of concept flow in the answer. An n-gram list may be generated to determine a style score. An entropy occurrence matrix may be utilized to determine the idea score and the cohesion score.

The CQS 306 may also implement a bi-directional transformer model for sentence prediction and sentence similarity determination. The CQS 306 may perform discriminative preference ranking of predetermined linguistic text features. The CQS 306 may implement score-specific word embeddings with long short term memories that are recurrent neural networks to perform the content quality scoring.

The CQS 306 may be trained by implementing a learning-to-rank machine algorithm which implements a pointwise, a pairwise, or a listwise approach. For the listwise approach, multiple graded samples may be input in order to train a model. The agreement between raters who graded the samples may be embedded into the loss function for the machine learning.

In a step 210 of the semi-automated long answer exam evaluation process 200, an examinee answer sheet to be evaluated is received. The examinee answer sheet may include one or more examinee answers that were drafted by the examinee in response to the one or more questions on the exam that was received in step 202. An exam with the questions may have been provided to the examinee/test-taker. The examinee then provides answers in essay form to the questions. The examinee answer sheet may be received by the semi-automated long answer exam evaluation program 110a, 110b in physical or digital form. The examinee answer sheet in digital form may be input into the ACD 304 of the semi-automated long answer exam evaluation program 110a, 110b.

The examinee answer sheet may include one or more physical papers. For examinee answer sheets that are received as physical papers, the semi-automated long answer exam evaluation program 110a, 110b may perform scanning and optical character recognition on the examinee answer sheets to convert the answer sheets to be in a digital format. The scanning may be performed with a camera or image scanner associated with the computer 102. Such conversion into a digital format may facilitate computer language processing of the examinee answers that are provided on the examinee answer sheet.

The examinee answer sheets may be received as a digital file, whereby the receiving may occur via the communication network 116 that is shown in FIG. 1. The receiving may occur via the semi-automated long answer exam evaluation program 110a receiving an uploaded file at the computer 102 or via the semi-automated long answer exam evaluation program 110b at the server 112 receiving a file with digital examinee answers that was transmitted via the communication network 116, e.g., that was transmitted from the computer 102 through the communication network 116 to the server 112.

In a step 212 of the semi-automated long answer exam evaluation process 200, constructs in the examinee answer sheet are detected. This step 212 may be performed in an analogous manner to step 206. This step 212 may be performed by the answer construct detector module (ACD) 304. Each construct from the examinee answers may be a sentence portion, a clause, a sentence, a paragraph, a set of consecutive sentence portions, a set of consecutive clauses, a set of consecutive sentences, and/or a set of consecutive paragraphs. Natural language processing for determining semantic sentence similarity may be used to perform the construct detection. The corresponding portions of the examinee answer that are indicated by the distinction markers for priority levels may each correspond to a respective answer construct of the examinee answer. Those priority levels may be based on a content quality score of the corresponding answer construct of the examinee answer.

In a step 214 of the semi-automated long answer exam evaluation process 200, the quality of content for each detected construct of the examinee answer sheet is evaluated. These constructs of the examinee answer sheet may be referred to as answer constructs. This step 214 may be performed in an analogous manner to step 208 of the semi-automated long answer exam evaluation process 200. This content quality evaluation may be performed by the CQS 306. This content quality evaluation may include an evaluation of the CAP factors of the examinee answers A level of completeness (C) of an answer may be evaluated by checking for a construct to match with each construct of a model answer. An answer accuracy (A) level may be detected. The answer accuracy may include an aspect of technical correctness as well as an additional aspect of language aspect such as with spelling, grammar, sentence forming, etc. A personality nuance (P) level of each answer may be detected to reveal one or more types of bias exhibited in the answer. Such biases may include cultural biases, geographical biases, etc.

As part of step 214 the CQS 306 may determine an overall answer quality which combines various parameter determinations. The overall answer quality may be referred to as an A-Type.

TABLE 5

| | Model Answer | | | Answer from Examinee Answer-sheet | | |
|---|---|---|---|---|---|---|
| Nested QA No. | Construct No. | Quality Type | Baseline Score | Automated detected quality type | Automated given Score | Automated Confidence Level |
| 1 | 1 | 1 (HHL) | 9.5 | HHL | 9.0 | 90% |
| 1 | 2 | 2 (HML) | 8.5 | HHL | 9.0 | 66% |
| 1 | 3 | 3 (HLL) | 7.0 | Missing construct | | 100% |
| 2 | 4 | 1 (HHL) | 9.0 | HML | 9.0 | 87% |
| 2 | 5 | 2 (HML) | 8.0 | MML | 8.0 | 63% |
| 2 | 6 | 3 (HLL) | 6.5 | New unidentified construct | | 10% |
| 3 | 7 | 1 (HHL) | 9.0 | HLL | 7.5 | 92% |
| 3 | 8 | 2 (HML) | 8.5 | HML | 8.5 | 59% |
| 4 | 9 | 3 (HLL) | 7.0 | Missing construct | | 100% |
| 4 | 10 | 3 (HLL) | 6.0 | New unidentified construct | | 15% |
| | | | | Additional constructs | | ... |

Table 5 shown above is an example of answer quality scoring that may be performed in step 214 and that may be performed by the CQS 306. This analysis of the examinee answer sheet produces score columns that may be compared side-by-side to score columns generated for the model answers. The automated confidence level column indicates what level of confidence the automated system has for its scoring for an identified construct of the examinee answer. This confidence level may be expressed as a percentage with 100% being most confident and 0% being least confident. Table 5 shows that the examinee answer may lack constructs that were in the model answer (see the label "Missing construct") and may also include constructs which the automated system does not successfully match with any construct from the model answer (see the label "New unidentified construct", e.g., an unrecognized construct).

This evaluation in step 214 may by itself or together with the construct identification from step 212 be referred to as a first-level evaluation of the answer sheets. This first-level evaluation is performed in an automated manner. One or both of the steps 212 and 214 together may be considered a grading of the examinee answer sheet based on the constructs of the model answer that was received in step 204. The first-level evaluation results made with respect to the examinee answer sheets may be stored in the data store 308 and may be used by the semi-automated long answer exam evaluation program 110a, 110b for further analysis.

In a step 216 of the semi-automated long answer exam evaluation process 200, an evaluator grading profile is received. This evaluator grading profile may be generated by and received from the Evaluate the Evaluator Module (ETE) 316. The evaluator grading profile relates to a human evaluator who may be chosen to review the results of the automated first-level evaluation that was achieved via a combination of previously-described steps of the semi-automated long answer exam evaluation process 200. The evaluator 318 in FIG. 3 is a depiction of a person for whom the evaluator grading profile is received. The evaluator grading profile may be based on previous grading that was performed by the evaluator 318 or by another evaluator when such other evaluator will be grading these essay exams.

The evaluator grading profile may provide information about strengths and weaknesses of a particular evaluator as determined by evaluating previous grading that was performed by the particular evaluator. This information may be in the form of quantifiable numbers. The evaluator grading profile may provide information about exam evaluation patterns of the particular evaluator. Such patterns may help guide the semi-automated long answer exam evaluation program 110a, 110b to make an adjustment to the exam evaluation scores that the human evaluator provides as a result of their evaluation. If the system determines that the evaluator 318 has a bias or grading flaw, the final scores for exams evaluated by the evaluator 318 may subsequently be adjusted to remove bias-related effects or grading flaw effects on the exam score. The evaluator grading profile may also provide information about an evaluator average grading time that the particular evaluator uses to evaluate particular exam answers, e.g., A-Type answers, e.g., overall quality scores for an answer.

The evaluator grading profile may be generated via a method in which the ETE module 316 generates exam answers and these computer-generated exam answers are presented to the evaluator 318 for grading by the evaluator 318. These exam answers generated by the ETE module 316 may be modifications to exam answers that are generated by the AtQPM 302. For example, the ETE module 316 may receive the model answers that were received in step 204 and the question paper that was received in step 202. The ETE module 316 may use these model answers and this question paper to generate simulated or mock exam answers that respond to the questions on the question paper. The generated simulated/mock exam answers may have certain terms, phrases, sentences, or paragraphs that are modified to introduce error in content or language and that are used to replacing the corresponding correct words from the model answers. These modifications would interfere with the accuracy rating of a model answer. The generated simulated exam answers may have certain personal nuances intertwined in that the model answer is rewritten, restructured, or rephrased, without changing the meaning, to incorporate a certain type of bias, e.g., a cultural bias, a geographical bias, etc. These modifications would interfere with the personal nuance rating as compared to the rating of the model answer. The generated simulated exam answers may also be modified by having certain constructs removed from or added to those constructs in the model answers. These modifications would interfere with the completeness rating of a model answer.

The modified exam answers are presented to the evaluator 318 for grading. The presentation may be done via display on a display screen of a computer or via printing physical papers. The evaluator 318 may then grade the modified exam answers. The evaluator 318 may then submit gradings for the modified exam answers to the ETE module 316.

To increase accuracy of an evaluator grading profile, the evaluator 318 may be required to grade multiple different modified exam answers to provide more data points for tracking or identifying any grading deficiencies of the evaluator 318. The system may require the evaluator 318 to evaluate three different modified answers for each overall quality type. Thus for a system configuration with nine overall quality types the system would want the evaluator to evaluate a total of twenty seven answers—three for each of the nine types.

The ETE module 316 may then compare the grades provided by the evaluator 318 to system-generated baseline results for the modified exam answers in order to determine and calculate deviations of the evaluator grades with respect to the system-generated baseline results. If the system-generated baseline results gave a 9.5 score to an exam answer having a first overall quality rating and the evaluator 318 gave a 9.0 score to another exam answer that also has the first overall quality rating (as determined by the automated determination), the ETE module 316 may determine a negative 0.5 deviation in the evaluator grading for answers with that overall quality type.

TABLE 6

| Qs | A-Type | Complete | Accurate | Nuance | % Deviation | Error Category |
|---|---|---|---|---|---|---|
| 3 | 1 (HHL) | 0 | −1, +2 | 0 | −5, −15 | A, E |
| 3 | 2 (HML) | −1 | +1 | 0 | +5 | A |
| 4 | 3 (HLL) | 0 | +1, +1, +1, +1 | +1, +1 | +10, +10, +10, +10 | E, E, E, E |
| 10 | 3 | 1 | 7 | 2 | 7 | |

Table 6 illustrates how some final evaluation scores may be adjusted based on an evaluator grading profile. Table 6 illustrates deviations that a particular evaluator made in identifying the correct level of the CAP quality factor and score. In the information shown for a particular evaluator, the information indicates that negative patterns or weaknesses were detected for this particular evaluator in (1) evaluating accuracy across A-types, (2) tending to generalize accuracy scores under a medium category, (3) having a high severity in deviation for A-type 3 (HLL), and (4) having a high severity in deviation for A-Type 1 HHL). Thus, the evaluator grading profile may indicate that for this particular evaluator a 10% reduction in marks would be appropriate to apply to any A-Type 3 exam scoring performed by this particular evaluator. The evaluator grading profile may also indicate that a 10% reduction in marks would be appropriate to apply to any A-Type 1 exam scoring performed by this particular evaluator.

The evaluator grading profile may indicate information regarding frequency of grading deviations made by a particular evaluator, magnitude of grading deviations made by a particular evaluator, deviations which did not largely shift an overall result of the grade (so that the deviation may be deemed as acceptable), deviations which shifted the overall result of the grade to an adjacent category (so that the deviation may be deemed as an error), and deviations which shifted the overall result to a distant category (so that the deviation may be deemed as a blunder).

In a step 218 of the semi-automated long answer exam evaluation process 200, an exam is evaluated with an automated evaluator assistant. An evaluator assistant module and user interface (EAUI) 320 may perform the step 218. The CQS score that was generated in step 214 may be passed to the EAUI 320 along with the one or more examinee answer sheets that were received in step 210 which may help enable the EAUI 320 to perform the exam evaluation. The evaluation of step 218 may include the automated evaluator assistant categorizing the constructs that were detected and may include generating various distinction markers for presenting the categorized constructs based on a category for each construct. In one embodiment, the distinction markers may have a distinct visible appearance. In another embodiment for audio presentation, the distinction markers may have a distinct audio sound that accompanies audio presentation of the exam answers. The appearance markers may be color highlights which highlight one or more portions of the text of the construct. The automated evaluator assistant may include one or more machine learning models that are trained with the course content, that are trained to generate exam questions and model answers from the course content, and that are trained to perform an automated grading of an examinee answer sheet.

The EAUI 320 may categorize each construct based on the CQS quality score and based on a CQS confidence score that were determined in previously-described steps as part of the first-level evaluation.

The distinction markers may help the evaluator 318 more quickly prioritize which answer grading determinations that were made by the automated system for the first-level evaluation to review with a first priority, with a second priority, etc.

For answer text and constructs that are presented with a first distinction marker, e.g., with a first color, e.g., with a green highlighting color, this presentation may indicate that the automated first-level evaluation finds this portion to be correctly graded and that it has a high degree of confidence in this grading. Some examples of a confidence level considered to be a high degree may be 87%, 90%, 92% or higher. In another embodiment, this portion considered as correctly graded may have a lack of highlighting so that this portion stands visibly in contrast to another portion that includes a color highlighting or some other distinctive marking.

For answer text and constructs that are presented with a second distinction marker, e.g., with a second color, e.g., with a yellow highlighting color, this presentation may indicate that the automated first-level evaluation graded this portion and has a moderate degree of confidence in this grading. Some examples of a confidence level considered to be a moderate degree may be 59%, 63%, 66% or higher and less than the high confidence level. These portions may be considered to have a moderate priority for review by the evaluator 318.

For answer text and constructs that are presented with no distinction marker, e.g., with no additional color and with no additional highlighting color, this presentation may indicate that the automated first-level evaluation did not grade this portion so that these portions have a first priority and so that the evaluator 318, i.e., the human evaluator, needs to grade these portions. Such a portion may be considered to be an unrecognized construct that is not recognized by the machine learning model of the semi-automated long answer exam evaluation program 110a, 110b that performs the automated first-level review of the examinee answer sheet. Alternatively, this portion that is not marked may indicate that the automated first-level review had a low degree of confidence in its grading of this portion. Such confidence level could be lower than the moderate confidence level, e.g., could be 10% or 15%. Along with this text without a distinction marker, the semi-automated long answer exam evaluation program 110a, 110b may generate questions for the human reviewer, e.g., for the evaluator 318, in order to prompt the human reviewer to provide their evaluation and judgment regarding this portion which the EAUI 320 and the Q&A Service 315 did not succeed in identifying or had a low confidence for their identification and grading. Alternatively, such a portion that had no grade or a grade selected with low confidence by the semi-automated long answer exam evaluation program 110a, 110b may be indicated by a color highlighting that is different from another color highlighting in the presentation in order to invoke first priority attention from the evaluator 318.

For answer text and constructs that are presented with a third distinction marker, e.g., with a third color, e.g., with red highlighting color, this presentation may indicate that the automated first-level evaluation found this portion to include a spelling error, a grammatical error, or other non-content-related language mistake.

Any reference above to a distinction marker may indicate a lack of a distinction marker when other portions of a word answer are marked with distinction markers, so that the different-type portions would be presented differently from each other.

In a step 220 of the semi-automated long answer exam evaluation process 200, the automated assistant evaluation is presented to the evaluator 318 for an evaluator review. In the pipeline 300 shown in FIG. 3, the presentation to the evaluator 318 may occur via the Evaluator Assistant Module and User Interface (EAUI) 320. This EAUI 320 may in at least some embodiments include a graphical user interface that is displayed on a display screen, e.g., on the display monitor 924 of the computer 102 or on a touch screen of the computer 102. The presentation may alternatively occur in an audible manner via playing of an audio recording, e.g., via a speaker that is connected to the computer 102. The presentation may include the graded examinee answer sheet including one or more distinction markers along with the examinee answer. The one or more distinction markers may indicate respective priority levels of corresponding portions of the examinee answer. The corresponding portions may be those word portions of the examinee answer which correspond in placement with respect to the distinction marker. For example, words marked with a first highlight may be considered to correspond in placement to the first highlight. Other words marked with a second highlight may be considered to correspond in placement to the second highlight.

An answer content color for the presentation of the examinee answer may be chosen based on first-level evaluation scores.

In a step 222 of the semi-automated long answer exam evaluation process 200, an evaluator review of the automated evaluator assistant output is received. In the pipeline 300 shown in FIG. 3, the evaluator 318 may interact with the EAUI 320 to perform and enter in an evaluation that he made to review the evaluator assistant output that came from the EAUI 320. The evaluator review may include scores and/or comments for various constructs or sections from the answers provided by the examinee. The evaluator review and any other activities and/or inputs from the evaluator 318 into the EAUI 320 may be saved in the data store 308. The input by the evaluator 318 for the various portions and/or constructs of the examinee answer sheet may be considered a respective evaluation tag.

The presentation of the first-level evaluation with the distinction markers helps the evaluator 318 to have priority guidance for reviewing portions of the first-level evaluation. In at least some embodiments, the evaluator 318 may know that the portions with no distinction marker should receive the highest priority in the review. The automated system did not recognize these portions and left the review for the human evaluator or had a low confidence in its grading determination for this portion. The evaluator 318 may know that the portions with the second distinction marker should be reviewed with a second level priority. The evaluator 318 should cross-check and confirm the automated evaluation of these portions marked with the second distinction marker. The evaluator 318 may ignore, review, and confirm, or review and override the first-level evaluation grading portions that were marked with the first distinction marker.

In one embodiment, the presentation to the evaluator 318 via the EAUI 320 may occur with a legend, e.g., a visible legend, which indicates the priority meaning of various distinction markers and/or of a lack of a distinction marker for various portions of the examinee answer on the examinee answer sheet.

If the evaluator 318 overrides a portion of the automated grading in the automated first-level evaluation, e.g., a portion marked with the first distinction marker, then an escalation may be generated that includes an evaluator override which means that the evaluator 318 seeks to override the grading of the automated system. The automated review system may learn, via machine learning, from those grading portions provided by the evaluator 318 regarding the moderate confidence portions marked with the second distinction marker. An input by the evaluator 318 for the moderate confidence portion may also generate an escalation for a content enrichment review. An input by the evaluator 318 in response to the moderate confidence portion may change the appearance of the distinction marker so that the first distinction marker is then shown indicating a level of higher confidence in that grading. An input by the evaluator 318 for the low confidence portion and/or for the portion marked with the second distinction marker indicating a grade made with moderate confidence may also generate an escalation for a content enrichment review. This evaluator input in some instances may be considered an evaluation tag in response to or regarding an unrecognized construct. An input by the evaluator 318 in response to the low confidence portion or to the second distinction mark portion (moderate confidence portion) may change the appearance of the distinction marker so that the first distinction marker is then shown indicating a level of higher confidence, e.g., so that the low confidence portion becomes the first distinction marker or the second distinction marker.

The EAUI 320 may also track and store the time which the evaluator 318 uses to review the automated first-level evaluation. This time may start when the presentation to the evaluator 318 starts and may end when the evaluator 318 submits their review back into the EAUI 320. The time may start when the evaluator 318 provides an input to acknowledge their receipt of the automated assistant evaluation of the examinee answer sheet.

In a step 224 of the semi-automated long answer exam evaluation process 200, the evaluator review is escalated to a reviewer. The reviewer 328 shown in the pipeline 300 in FIG. 3 may be a human reviewer and may generate his or her review by providing feedback to the escalation and/or content enrichment portions that the evaluator 318 generated when the evaluator 318 reviewed the automated first-level evaluation. The reviewer 328 may receive this evaluator review and provide feedback to the evaluator review using the Approver/Reviewer Module and User Interface (ARUI) 326. The ARUI 326 may present to the reviewer 328 the review of the evaluator 318 including evaluation tags made by the evaluator 318 regarding unrecognized constructs or overrides.

The semi-automated long answer exam evaluation program 110a, 110b may prioritize the escalation and content enrichment cases in the evaluator review based on a review priority order. The review priority order may be based on an acceptability score that is calculated. The acceptability score may be shared, along with the escalation and content enrichment cases, with the reviewer 328 who may also be considered an approver. Portions with a low acceptability score may be presented first to the reviewer 328 followed by portions with increased acceptability scores. The acceptability score for each portion may be calculated based on an evaluator grading profile and on grading strengths and weaknesses of the evaluator as indicated in the evaluator grading profile that was received in step 216. The system may interpret the acceptability score to mean that increases mean higher system confidence in the grading choices made by the evaluator 318 and decreases mean lower system confidence in the grading choices made by the evaluator 318. One example of a low acceptability score is if the answer construct has a low score and the evaluator grading profile contains a high deviation score for this type of answer. The presentation to the reviewer 328 via the ARUI 326 in a prioritized manner of the cases for review may occur with various distinction markers to help draw the attention of the reviewer 328 to those cases with the highest priority. The prioritized manner may include presenting the review cases in a descending order with the most important cases, e.g., with those cases having the lowest acceptability score, being presented higher in the list.

In a step 226 of the semi-automated long answer exam evaluation process 200, a review of the reviewer 328 is received. The reviewer 328 may generate this review by providing feedback to the escalation and content enrichment cases that were generated in the review performed by the reviewer 328. This feedback may be provided via the ARUI 326, e.g., by the reviewer 328 touching a touch screen of the computer 102 or by the reviewer 328 typing in feedback with a keyboard 926 associated with the computer 102. The review may include acceptance or rejection by the reviewer 328 of evaluation tags that were presented to the reviewer 328 regarding escalation points, e.g., evaluator overrides and/or possible content enrichment cases.

The prioritized list of review cases can be reviewed by the reviewer 328. The acceptability scores may help the reviewer 328 give appropriate priority to each review case. The prioritized list may help the reviewer 328 more quickly validate/accept or reject a grading decision proposed by the evaluator 318. The reviewer 328 may consider the calculated acceptability scores, baseline CAP values, and other evaluator grading profile factors related to the questions and answers and to the evaluator. The reviewer 328 may make a decision regarding each escalation case, as these escalation cases may impact a final score for the examinee and may impact feedback that would be given to the student examinees and to the evaluator 318. The ARUI 326 also shows to the reviewer 328 the evaluation and answer-wise score adjustments and rationale that were derived with the help of the evaluator grading profile.

The reviewer 328 also may review content enrichment cases and content enrichment items. Examples of such cases may include system generated scores/comments with medium/low confidence, constructs tagged by evaluators, new answer samples, and examples (e.g., a new case study used as an answer example), etc.

In a step 228 of the semi-automated long answer exam evaluation process 200, new answer content based on the evaluator review is saved as answer enrichment or content enrichment. This new answer content may be saved in the data store 308 as part of a model answer and may be accessed by the Q&A Service 315 or be part of the Q&A Service 315 for this course content. The semi-automated long answer exam evaluation process 200 may require the reviewer 328 to approve of new answer content identified by the evaluator 318 before the new content may be stored as part of the model answer. The new answer content may be available to the Q&A service 315 and to the semi-automated long answer exam evaluation program 110a, 110b for performing automated exam answer evaluations for exam responses provided by other examinees.

In a step 230 of the semi-automated long answer exam evaluation process 200, reports are generated and presented. In the pipeline 300 shown in FIG. 3, a Report Generation Module 330 may perform the generation of reports of step 230. The Report Generation Module 330 may take various inputs from the data store 308 and may generate various reports. Each report may be targeted for a respective stakeholder of the semi-automated long answer exam evaluation program 110a, 110b, e.g., an examinee, the evaluator 318, the reviewer 328, or an exam administrator 334.

A system effectiveness report may be generated in step 230. The system effectiveness report may indicate an achieved evaluation effectiveness in terms of the time and effort saved by the evaluator 318 using the semi-automated long answer exam evaluation program 110a, 110b as compared to the evaluator 318 performing complete manual grading of the exams or compared to the evaluator 318 using another evaluation system. This report may compare and present the evaluator average grading time of the evaluator 318 to the amount of time that the evaluator 318 took to review the graded examinee answer sheet with distinction markers and to submit the evaluation of this graded examinee answer sheet. The system effectiveness report may include an effort-saving calculation that incorporates the successful generation of score/comments for answer constructs of a given answer type that were accepted by the reviewer 328. The given answer type may be based on a CAP score.

An effort-saving score for the semi-automated long answer exam evaluation program 110a, 110b and its grading suggestions in the first-level evaluation may be higher when one or both of the evaluator 318 and the reviewer 328 accept those scores or determinations that were made by the automated system. The effort-saving score for the grading of the computer system may be based on at least one of a quality level score and a priority level score. The quality level score may be based on correct determination by the semi-automated long answer exam evaluation program 110a, 110b of a content quality score for the examinee in the model answer. When a content quality score determined by the semi-automated long answer exam evaluation program 110a, 110b for the examinee answer is confirmed by one or both of the evaluator 318 and the reviewer 328, the quality level score for the effort-saving score will be higher. When the priority levels for the presenting of the examinee answer that occurs in steps 218 and 220 are confirmed by one or both of the evaluator 318 and the reviewer 328, the priority level score for the effort-saving score will be higher. This priority level confirmation may occur when the evaluator 318 does not perform overrides or when the reviewer 328 rejects overrides that were suggested by the evaluator 318.

An evaluator ranking report may be generated in step 230 and may include evaluator scores that are based on factors such as the number of valid escalation items raised by the evaluator 318, the number of content enrichment items added by the evaluator 318 for answering exam questions, an achieved evaluation effectiveness with the semi-automated long answer exam evaluation program 110a, 110b, the improvement shown in the evaluator grading profile weaknesses, the stickiness of the evaluator 318 to the evaluator grading profile strengths, and an amount of time spent by the evaluator 318 for performing the review. This ranking report may be intended for the reviewer 328, for the exam administrator 334, and/or for the evaluator 318.

Self-improvement reports for the semi-automated long answer exam evaluation program 110a, 110b may be generated in step 230 based on approved escalations and on approved content enrichment cases. This self-improvement report may be intended for the evaluator 318.

The evaluator 318 and/or an exam administrator 334 may access the reports that are generated via the Report Generation Module 330. Various stakeholder may access the system for reports generated by Report Generation Module 330. An examination authority may access a generated report to prepare final feedback and/or a score for students and/or a rank for the evaluator 318. The examination authority may share the reports with the students/examinees and/or with the evaluator 318 and/or with the examination authority 334. The evaluator 318 may access a report that includes evaluation feedback and assistance that the evaluator 318 received from the semi-automated long answer exam grading program 110a, 110b. This report may include escalated cases from the evaluation session performed by the evaluator 318 and decisions made by the reviewer 328 regarding the escalation cases. This report may help the evaluator 318 be aware of his strengths and weaknesses on his examination scoring approaches so that he can work on his weaknesses and yet maintain his strengths. Auditors/approvers may access a generated report regarding how many escalation points, e.g., for overriding the system score/comments, were generated by the evaluator 318. A reviewer 328, who may be a system/content reviewer, may access a generated report that shares what the semi-automated long answer exam grading program 110a, 110b learned from this evaluation performed by the evaluator 318 for a particular examinee answer sheet. Leanings can be used to enhance the semi-automated long answer exam grading program 110a, 110b if approved by reviewer.

In a step 232 of the semi-automated long answer exam evaluation process 200, a determination is made as to whether there are more exams to evaluate. For a negative determination, the semi-automated long answer exam evaluation process 200 may proceed to the end of the semi-automated long answer exam evaluation process 200. For a positive determination, the semi-automated long answer exam evaluation process 200 may proceed to step 210 for repeat of the semi-automated long answer exam evaluation process 200 for a new examinee answer sheet.

The semi-automated long answer exam evaluation process 200 may also be repeated starting from step 202 for other exams that are to be administered to examinees.

It may be appreciated that FIGS. 2 and 3 provide only illustrations of some embodiments and do not imply any limitations with regard to how different embodiments may be implemented. Many modifications to the depicted embodiment(s), e.g., to a depicted sequence of steps, may be made based on design and implementation requirements.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and server 112 may include respective sets of internal components 902a, 902b and external components 904a, 904b illustrated in FIG. 4. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108a, and the semi-automated long answer exam evaluation program 110a in client computer 102, the software program 108b and the semi-automated long answer exam evaluation program 110b in server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108a, 108b and the semi-automated long answer exam evaluation program 110a, 110b can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The software program 108a and the semi-automated long answer exam evaluation program 110a in client computer 102, the software program 108b and the semi-automated long answer exam evaluation program 110b in the server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108a, 108b and the semi-automated long answer exam evaluation program 110a in client computer 102 and the semi-automated long answer exam evaluation program 110b in server 112 are loaded into the respective hard drive 916. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
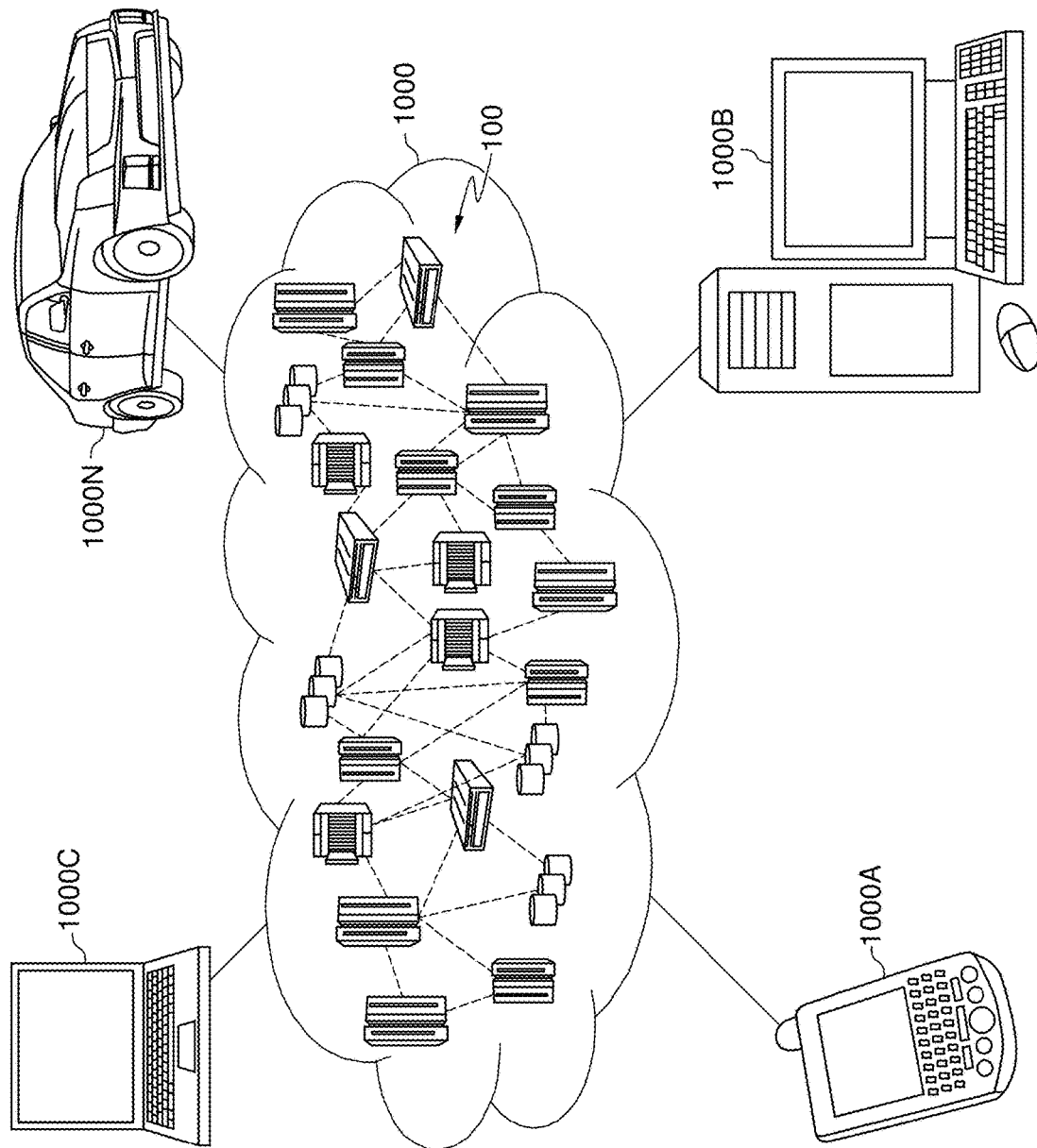
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1900 can communicate with any type of computerized device over any type of network and/or network addressable connection (e.g., using a web browser).

Referring now to FIG. 6, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and semi-automated long answer exam evaluation 1156. A semi-automated long answer exam evaluation program 110a, 110b provides a way to improve grading of essay exams by harnessing the power of artificial intelligence and human oversight.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for semi-automated exam grading, the method comprising:
   receiving an exam comprising a question;
   receiving a model answer to the question, wherein the model answer comprises an essay form;
   identifying, via a computer system, constructs in the model answer;
   receiving an examinee answer sheet comprising an examinee answer to the question;
   grading, via the computer system, the examinee answer of the examinee answer sheet based on the constructs of the model answer; and
   presenting, via the computer system, the graded examinee answer sheet to an evaluator for review, wherein the graded examinee answer sheet includes one or more distinction markers along with the examinee answer, and wherein the one or more distinction markers indicate respective priority levels of corresponding portions of the examinee answer.

2. The method of claim 1, wherein the one or more distinction markers comprise a respective color highlight of the corresponding portion of the examinee answer.

3. The method of claim 1, wherein an unrecognized construct is presented with a first distinction marker for review by the evaluator, and wherein the first distinction marker indicates a highest priority level.

4. The method of claim 3, further comprising:
   receiving an evaluation tag from the evaluator regarding the unrecognized construct; and
   presenting the evaluation tag to a reviewer as a possible content enrichment case.

5. The method of claim 4, further comprising:
   receiving, from the reviewer, a reviewer acceptance of the presented evaluation tag; and
   storing the unrecognized construct in a database as a part of the model answer.

6. The method of claim 1, further comprising:
   receiving an evaluator override of one or more graded decisions of the automated grading that occurs via the computer system.

7. The method of claim 6, further comprising presenting the evaluator override to a reviewer for review by the reviewer.

8. The method of claim 1, further comprising:
   receiving, from the evaluator, evaluation tags, evaluator overrides, or both evaluation tags and evaluator overrides; and
   presenting the evaluator tags, the evaluator overrides, or both the evaluator tags and the evaluator overrides to a reviewer with a review priority order.

9. The method of claim 8, further comprising:
   receiving an evaluator grading profile regarding the evaluator, wherein the evaluator grading profile is based on previous grading performed by the evaluator;
   wherein the review priority order is determined at least in part based on the evaluator grading profile.

10. The method of claim 1, wherein the grading, via the computer system, is performed via at least one machine learning model.

11. The method of claim 1, wherein the grading comprises identifying answer constructs in the examinee answer of the examinee answer sheet and providing a respective content quality score for each identified answer construct of the examinee answer of the examinee answer sheet;
    wherein the respective content quality score is based on at least one factor selected from the group consisting of completeness, accuracy, and personality nuances.

12. The method of claim 11, wherein the corresponding portions of the examinee answer correspond, respectively, to the answer constructs of the examinee answer, and
    wherein the priority levels of the corresponding portions of the examinee answer are respectively based on the respective content quality score of the corresponding answer construct.

13. The method of claim 1, further comprising:
    receiving an evaluator grading profile regarding the evaluator, wherein the evaluator grading profile comprises an evaluator average grading time;
    determining, via the computer system, a first amount of time for the evaluator to review the graded examinee answer sheet; and
    presenting, via the computer system, a comparison of the first amount of time and the evaluator average grading time.

14. The method of claim 1, further comprising:
    receiving the review of the evaluator;
    presenting the review of the evaluator to a reviewer; and
    calculating an effort-saving score for the grading of the computer system, wherein the effort-saving score is based on at least one of:
    a quality level score based on correct determination of a content quality score for the examinee answer, and
    a priority level score based on correct determination of the priority levels for the presenting of the examinee answer.

15. The method of claim 1, further comprising:
  receiving the review of the evaluator; and
  analyzing, via the computer system, the review of the evaluator to generate an evaluator score to rank the evaluator, wherein the evaluator score is based on an at least one factor selected from the group consisting of: a number of valid escalation items raised by the evaluator, a number of content enrichment items added to the model answer and that were approved by the evaluator; and an amount of time spent by the evaluator for performing the review.

16. A computer system for semi-automated exam grading, the computer system comprising:
  one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    receiving an exam comprising a question;
    receiving a model answer to the question, wherein the model answer comprises an essay form;
    identifying constructs in the model answer;
    receiving an examinee answer sheet comprising an examinee answer to the question;
    grading the examinee answer of the examinee answer sheet based on the constructs of the model answer; and
    presenting the graded examinee answer sheet to an evaluator for review, wherein the graded examinee answer sheet includes one or more distinction markers along with the examinee answer, and wherein the one or more distinction markers indicate respective priority levels of corresponding portions of the examinee answer.

17. The computer system of claim 16, wherein the one or more distinction markers comprise a respective color highlight of the corresponding portion of the examinee answer.

18. The computer system of claim 16, wherein an unrecognized construct is presented with a first distinction marker for review by the evaluator, and wherein the first distinction marker indicates a highest priority level.

19. A computer program product for semi-automated exam grading, the computer program product comprising a computer-readable storage medium having program instructions embodied therewith, wherein the program instructions are executable by a computer system to cause the computer system to perform a method comprising:
  receiving an exam comprising a question;
  receiving a model answer to the question, wherein the model answer comprises an essay form;
  identifying constructs in the model answer;
  receiving an examinee answer sheet comprising an examinee answer to the question;
  grading the examinee answer of the examinee answer sheet based on the constructs of the model answer; and
  presenting the graded examinee answer sheet to an evaluator for review, wherein the graded examinee answer sheet includes one or more distinction markers along with the examinee answer, and wherein the one or more distinction markers indicate respective priority levels of corresponding portions of the examinee answer.

20. The computer program product of claim 19, wherein the one or more distinction markers comprise a respective color highlight of the corresponding portion of the examinee answer.

* * * * *